United States Patent [19]

Sayous

[11] 3,981,379
[45] Sept. 21, 1976

[54] DEVICE FOR EMITTING MECHANICAL WAVES

[75] Inventor: Léon Sayous, Pau, France

[73] Assignee: Societe Nationale des Petroles d'Aquitaine, Courbevoie, France

[22] Filed: May 30, 1975

[21] Appl. No.: 582,241

[30] Foreign Application Priority Data
May 31, 1974   France .............................. 74.18911

[52] U.S. Cl. ............................... 181/118; 181/117; 181/401; 181/402
[51] Int. Cl.² ....................... G01V 1/06; G01V 1/14
[58] Field of Search ............ 181/117, 118, 401, 402

[56] References Cited
UNITED STATES PATENTS

| | | |
|---|---|---|
| 3,353,623 | 11/1967 | Flatow et al. ..................... 181/401 X |
| 3,429,396 | 2/1969 | Jenner et al. ....................... 181/117 |
| 3,480,102 | 11/1969 | Kilmer ................................ 181/117 |
| 3,746,120 | 7/1973 | Kilmer ................................ 181/117 |

Primary Examiner—Leland A. Sebastian
Attorney, Agent, or Firm—Brisebois & Kruger

[57] ABSTRACT

This invention concerns a device for emitting mechanical waves in an external medium.

This device comprises an annular or axial combustion chamber, shut by a valve, and comprising means of introducing fuel and oxidant, and an ignition system; the valve is composed of a differential piston, one side of which forms a mobile wall of a chamber containing fluid under pressure, and part of the other side of which forms a mobile wall of the combustion chamber.

This device is used mainly to generate compression waves for the purpose of seismic exploration.

10 Claims, 10 Drawing Figures

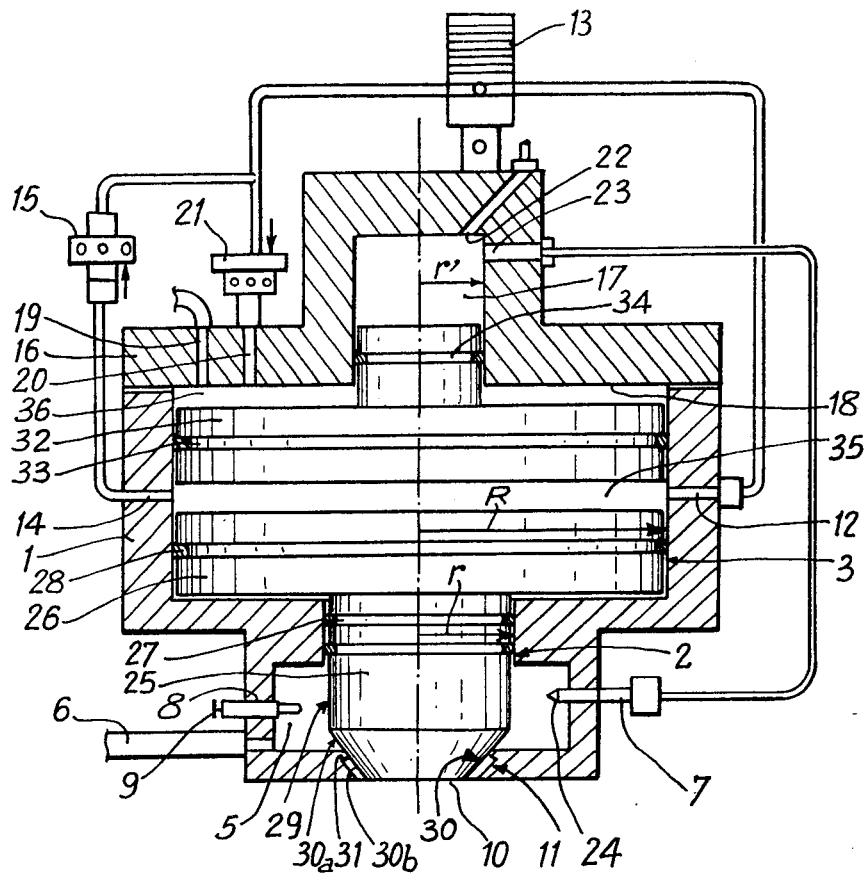
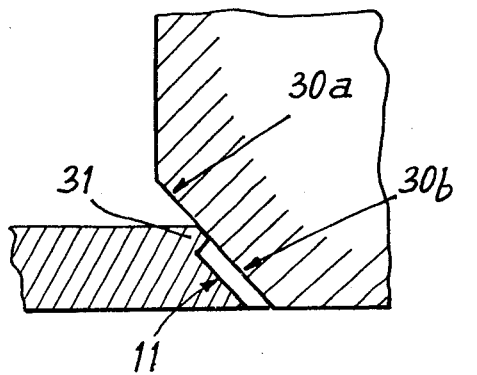
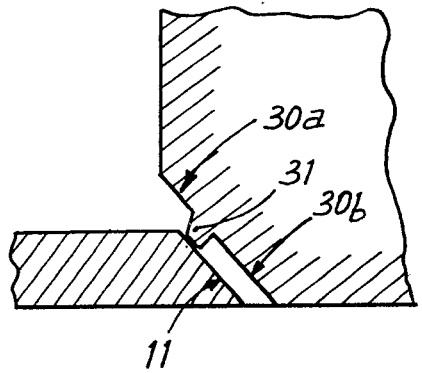

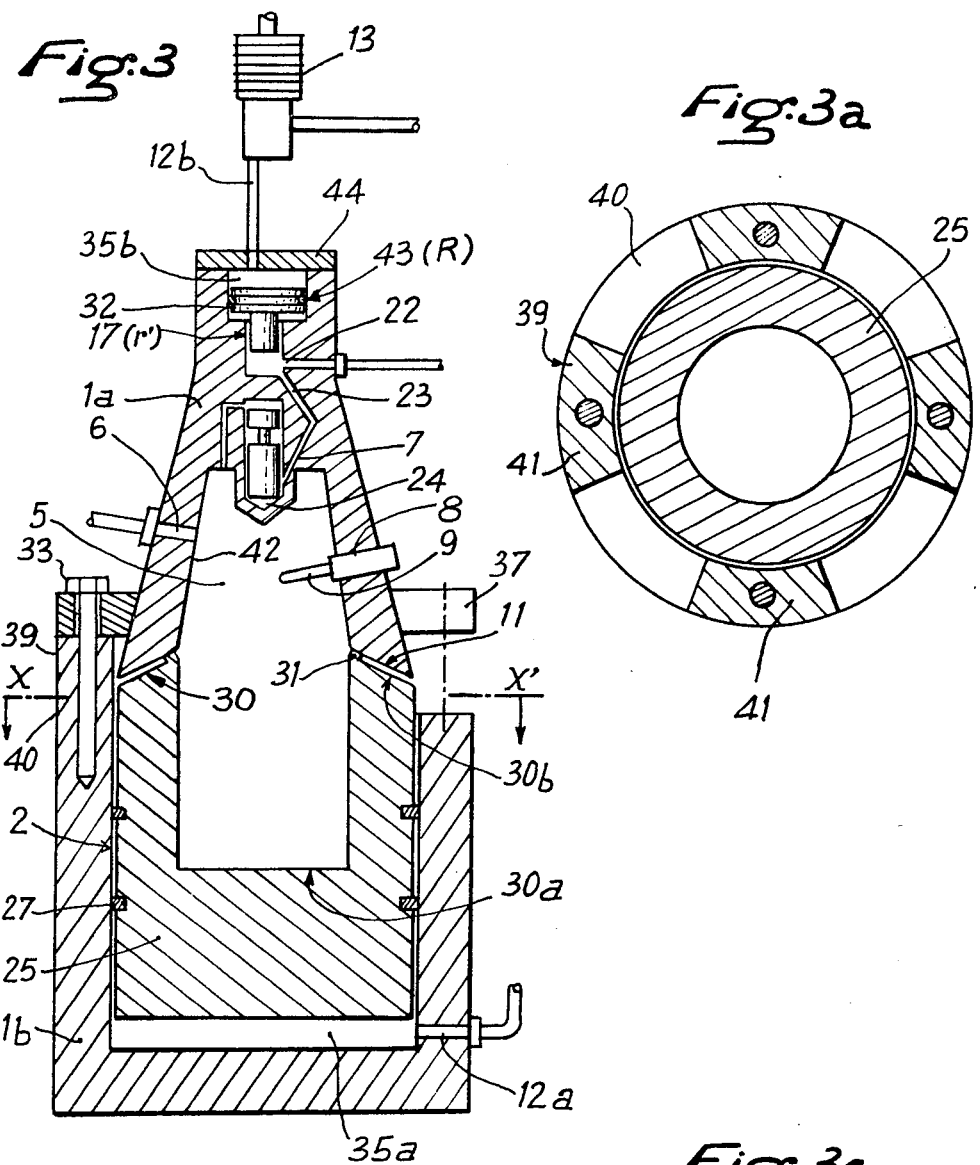
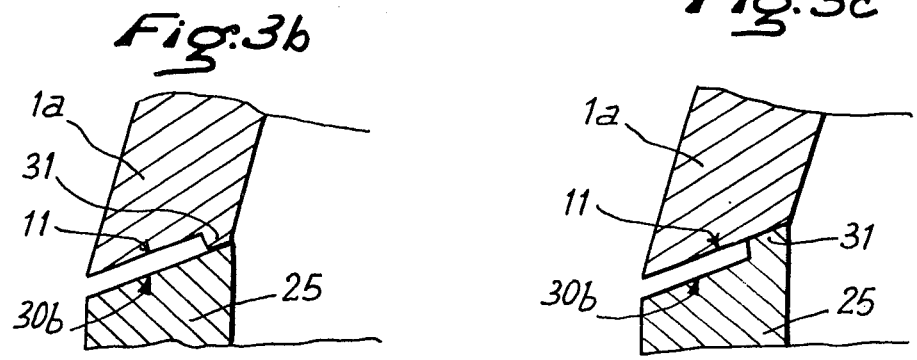

DEVICE FOR EMITTING MECHANICAL WAVES

This invention concerns a device for emitting mechanical waves in an external medium, particularly a liquid medium, and which can be used for seismic exploration, by the repetition at short, regular intervals of such emissions.

Various types of such wave generators already exist; they involve either the opening of a chamber containing previously compressed air, or the firing of a mixture of combustible gas and air, or the firing of a combustible mixture of atomized liquid hydrocarbons and compressed air, either in a chamber which opens into the external medium, or in a chamber which, after firing of the mixture, is brought into communication with a second chamber containing a volume of combustible mixture of similar composition.

Such devices are limited in two ways: first, the sum of energy available in each device for each emission is restricted, because of the necessarily limited previous pressure; second, the energy-transmission coefficient from the gaseous medium to the liquid medium is limited, because of the slightness of the solid angle at which emission occurs.

Because of these limitations, the use of such wave-generators in marine exploration requires a considerable number of sources of emission, involving highly complex and expensive equipment.

The device described in the present invention overcomes these difficulties, making it possible to obtain high pressures, of around 800 bars, over an extensive impact zone. The increased sum of energy available, and the improved transmission coefficient, reduce the number of devices to the number needed to ensure elimination of surface waves.

This new mechanical wave-emitting device comprises a valve and a casing containing a seat for said valve, said valve and casing being coaxial and defining a combustion chamber, which can be brought into communication with the external medium by axial movement of the valve, and which comprises means of admitting fuel and oxidant, as well as ignition means, said device being characterized by the fact that the valve is a differential piston, one side of which forms a mobile wall of a chamber containing fluid under pressure, and part of the other side of which forms a mobile wall of the combustion chamber.

In certain embodiments, the valve seat contains an annular projection, several tenths of a millimetre high, to ensure a hermetic contact with the valve.

In other embodiments, the valve contains an annular projection, several tenths of a millimeter high, to ensure a hermetic contact with the valve seat.

In various embodiments, the surfaces of the valve seat and valve facing each other, outside the combustion chamber and extending from the annular projection, are inclined equally by at least several degrees to the common axis, the distance between the surfaces being equal to the height of the projection, and in addition the geometrical projection along the axis of the valve seat and valve surfaces facing each other, outside the combustion chamber and extending from the annular projection, is at least 25% of the geometrical projection along the axis of the surface of the mobile wall of the combustion chamber.

In one preferred embodiment, the combustion chamber is annular in shape, with the valve inside the casing.

In other embodiments, the combustion chamber is annular in shape, but the valve is outside the casing.

In still another embodiment, the combustion chamber occupies an axial part of the casing, with the valve sliding inside the casing, and vents are provided in the casing opposite and level with the valve seat.

It will be easier to understand the invention from the following description of some of the many possible embodiments, with reference to the accompanying figures.

FIG. 1 shows a device with an annular combustion chamber and a valve inside the casing.

FIG. 1a is a detailed view of the valve seat, with a projection on the casing.

FIG. 1b is a detailed view of the valve seat, with a projection on the valve.

FIG. 3 shows a device wherein the combustion chamber and the valve are arranged axially.

FIG. 3a is a cross-section along the line XX' in FIG. 3.

FIG. 3b is a detailed view of the valve seat, with a projection on the casing.

FIG. 3c is a detailed view of the valve seat, with a projection on the valve.

Figure 2:
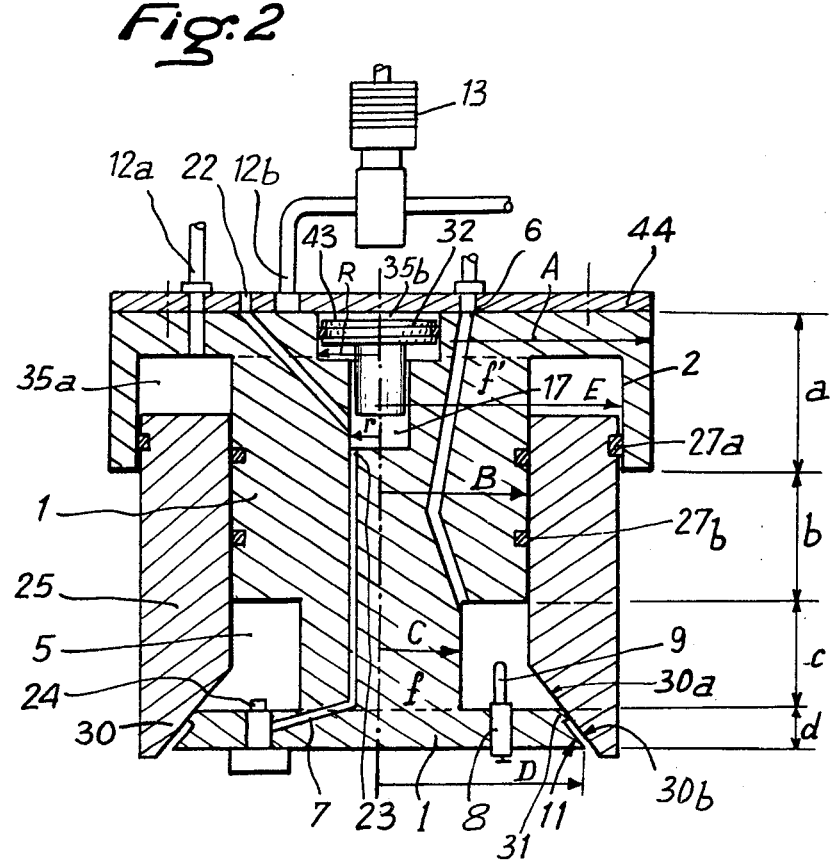
FIG. 2 shows a device with an annular combustion chamber and a valve outside the casing.

In the embodiment shown in FIG. 1, the device comprises a cylindrical casing 1, containing two cylindrical cavities, circular in section, concentric and communicating with each other: a lower cavity 2 with radius $r$ and another cavity 3 with radius R, the ratio of R to $r$ being between 1 and 4.

Level with and on the inner perimeter of the lower cavity 2, the casing 1 contains an angular cavity 5, into which open passages such as passage 6 adapted to admit compressed air, passage 7 adapted to admit fuel, and passage 8 adapted to allow ignition means 9 to be installed.

The lower cavity 2 opens to the outside at the bottom, through a circular axial opening 10, forming a frusto-conical section 11 in the thickness of the casing.

The cavity 3 is open at the top over its whole cross-sectional area and is provided in its median portion with at least two openings, including one or more openings 12, for admitting compressed air delivered by a three-way electrovalve 13, and one or more openings 14, through which said compressed air is discharged through a valve 15 which is monitored by said electrovalve.

The top end of the cavity 3 is covered by a cylindrical cap 16, coaxial with the casing 1 and attached to the latter. This cap has a cylindrical recess 17, concentric with the cavity 3 and communicating with it, with radius $r'$, the ratio of R to $r'$ being from 2 to 5. The cavity 3 is bounded by an annular surface 18 of the cap 16.

This annular surface 18 of the cap 16 has an aperture 19 for admitting compressed air, and an aperture 20, through which the compressed air is discharged through a valve 21 monitored by electrovalve 13.

The upper part of the recess 17 has an aperture 22 for admitting fuel, and one or more apertures such as 23 for evacuating the fuel, which passes through passages such as 7 into the annular cavity 5, to supply injectors such as 24.

Arranged in casing 1 is a valve 25 which is slidably mounted in cavity 2 and is integral with a piston 26 which is slidably mounted in the lower half of the cavity 3. The top of this valve 25 is fitted with at least one seal 27, and the piston 26 is also fitted with a seal 28.

The valve 25 consists substantially of a cylindrical portion 29 of circular cross-section, and is terminated at the bottom by a frusto-conical portion 30, the angle at the apex of which is the same as that of the frusto-conical surface 11.

The surface 30 of the frusto-conical portion of the valve 25 rests on the frusto-conical surface 11 of the casing, along an annular area 31 corresponding to a projection which, in FIGS. 1 and 1a, forms an integral part of the casing 1.

FIG. 1b shows a modification in which the projection 31 forms an integral part of the valve 25. In both embodiments, the projection which forms part either of the valve seat or of the valve, has a height of several tenths of a millimeter, and a width of several millimeters.

In the embodiments shown in FIGS. 1a and 1b, the surface 30b of the valve facing the valve seat 11 and the surface of the valve located outside the combustion chamber and extending from the annular projection, have the same angle or inclination to their common axis, of at least a few degrees, the distance between the surfaces being equal to the height of the projection.

The geometrical projection along the axis $xx'$ of the truncated conical surface 30b is equal to at least 25% of the geometrical projection along the axis $xx'$ of the truncated conical surface 30.

A piston 32 of differential section is slideably mounted in the upper cavity 3 and the cylindrical recess 17. This piston is fitted with seals, on the part moving inside the cavity 3, and on the part moving inside the cylindrical recess 17.

When the two pistons 26 and 32 are separated from each other, the central part of the cavity 3 between them forms a pressurized fluid containing chamber 35, called "pneumatic chamber".

When the piston 32 moves away from the cap 16, an annular chamber 36 is defined which is occupied by the same pressure fluid as that contained in chamber 35.

FIG. 2 shows an embodiment in which the mechanical wave-emitting device comprises an element 1 having the shape of a solid of revolution centered on an axis $xx'$ and consisting of four parts. The first three parts are cylindrical parts having comparable and possibly equal lengths $a$, $b$ and $c$, and decreasing radii A, B and C. In the embodiment shown, the ratios of these radii to one another are approximately 3, 2 and 1.

The fourth part is in the shape of a truncated cone, with an outer surface 11. The apex of this cone lies on the axis $XX'$ above the fourth part. The length of this part, along axis $XX'$, is less than the three other parts (eg. one-fourth of C), and the value of the radius D of its lower surface is between the values of radii A and B. For convenience in machining and assembly, either the lower or upper part of element 1 is attached by means known per se to the rest of the casing, for example along the surfaces indicated by dotted lines $f$ and $f'$.

The upper cylindrical part, of radius A, has an annular groove in its lower annular surface, forming an annular chamber 2. This groove is rectangular in cross-section, and is bounded on both sides by two cylindrical surfaces, of radius B and E respectively. The value of radius E is comprised between the values of radii A and B.

A cylinder slides on the second cylindrical part (of radius B) of element 1, forming a valve 25. The inside diameter of this valve is several hundredths of a millimeter greater than B, and the outer diameter is several hundredths of a millimeter less than E. The bottom of this valve 25 ends in a truncated conical surface 30, the apex of which lies on an axis $XX'$ extending above the surface 30. The angles at the apex of the cone including the surface 11, which forms the lower end of element 1, and of the cone including the surface 30, forming the lower end of the value 25, are equal.

The valve 25 is fitted with at least one seal 27a at the top of its outside surface, and at least one seal 27b on its inner surface.

Figure 2B:
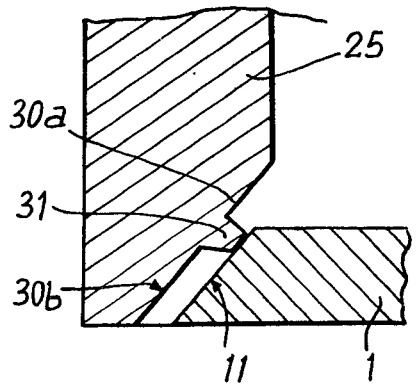
FIG. 2b is a detailed view of the valve seat, with a projection on the valve.
Figure 2A:
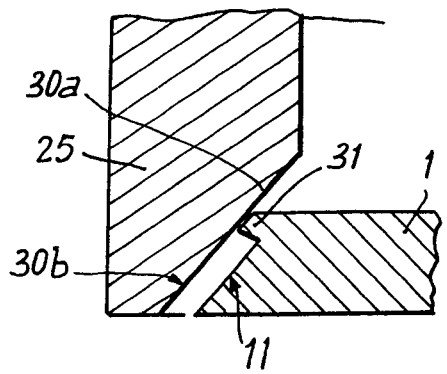
FIG. 2a is a detailed view of the valve seat, with a projection on the casing.

In the embodiment shown in FIGS. 2 and 2a, the truncated conical surface 11 carries a projection 31 at the top, several tenths of a millimeter high and several millimeter wide. This forms the seat for the valve 25.

In the embodiment shown in FIG. 2b, the projection is an integral part of the frusto-conical surface 30. It is several tenths of a millimeter high and several millimetres wide, and its frusto-conical peripheral surface cooperates with the valve 25 at the upper portion of the frusto-conical seat 11.

In the embodiments shown in FIGS. 2a and 2b, the surfaces facing each other, to wit surface 30b of the valve 25, and the surface of the valve seat 11 outside the combustion chamber and extending from the annular projection 31, have the same angle of inclination, of at least several degrees, to their common axis, and the distance between these surfaces is equal to the height of the projection 31.

The geometrical projection along the axis $XX'$ of the frusto-conical surface 30b is equal to at least 25% of the geometrical projection along the axis $XX'$ of the frusto-conical surface 30.

The two cylindrical parts of radius B and C, and the frusto-conical part with a base radius of D, form an annular cavity 5 in element 1. This cavity is sealed or brought into communication with the external medium by valve 25.

Into cavity 5 opens at least one passage such as 6 adapted to admit compressed air, and passages such as 7 adapted to admit fuel to an injector, as well as passages such as 8 allowing ignition means 9 to be mounted.

The body of element 1 comprises two concentric cylindrical recesses which communicate with each other, to wit: a recess 17 of radius $r'$ at the bottom, and a recess 43 of radius R above it, the ratio of $Rr'$ being comprised between 2 and 4.

Recess 43 opens on to the top outer surface of element 1, where it extends over a circular area of radius R. A plate 44 is attached to the top of element 1, closing the recess 43, and traversed by a passage 12B adapted to admit compressed air from a three-way electrovalve 13.

A piston 32 with differential section is slideably mounted in recesses 17 and 43, leaving a cylindrical space 35b in the cylindrical recess 43, between the top of the piston and the plate 44.

An aperture 23 opens into the bottom of the recess 17 and is adapted to admit fluid fuel, and another aperture 22 is provided for discharging said fuel, which passes through a passage 7 provided in element 1, so as to supply at least one injector such as 24 opening on the inside surface of the annular chamber 5, and, in the embodiment illustrated in FIG. 2, on the lower surface of this chamber, to make dismantling easier.

In another embodiment illustrated in FIG. 3, the device comprises a lower cylindrical element 1b, circular in cross-section, and having a concentric cylindrical recess 2, and an upper element 1a, forming the cover of the device, concentric with the lower element 1b, to which it is attached by perforated flanges 37 and bolts 33.

The upper edge 39 of the lower element 1b has slots 40 separating supporting areas 41 on which the upper casing 1a rests. This is illustrated in FIG. 3c, which shows a cross-sectional view of the elements 1a, 1b taken along the line XX' of FIG. 3.

The upper element 1a contains a cavity 5 which opens downwardly into the cylindrical recess 2. The cavity 5 is bounded by a wall 42 which comprises passages such as 6 for admitting compressed air, passages such as 7 for admitting fuel to injectors such as 24, and passages such as 8 allowing an ignition system 9 to be fitted.

A cylindrical valve 25 slides longitudinally in recess 2, in such a way that its lower and the lower part of recess 2 form a space 35a, at the bottom of recess 2. At least one passage such as 12a for admitting compressed air opens into this space 35a.

The body of the upper element 1a has two concentric cylindrical recesses which communicate with each other, to wit: a recess 17 of radius r' at the bottom, and a recess 43 of radius R above it, the ratio of R/r' being comprised between 2 and 4.

The recess 43 opens on to the top outer surface of element 1a, in a circular area of radius R. A plate 44 is attached to the top of element 1a, closing recess 43, and traversed by a passage 12b for admitting compressed air from a three-way electrovalve 13.

A piston 32 with differential section is slideably mounted in recesses 17 and 43, leaving a cylindrical space 35b in the recess 43, between the top of the piston and the plate 44.

The bottom of recess 17 has a passage 22 for admitting fuel, and a passage 23 for discharging the fuel through a passage 7 in the body of element 1a to at least one injector 24 on the lower surface 42 of element 1a.

The upper element 1a is bounded at the bottom by a coaxial frusto-conical surface 11 which, in the embodiment illustrated in FIGS. 3 and 3b, carries a projection 31 having a height of several tenths of a millimeter and a width of several millimeters and located close the the inner periphery of the surface 11.

Valve 25 has an upper coaxial frusto-conical surface 30 with the same angle at the apex as the frusto-conical surface 11.

When valve 25 rests on its seat 11, contact is established between the surface 30 and the outer periphery of projection 31.

In the embodiment illustrated in FIG. 3c, the frusto-conical surface 30 comprises a projection 31, by which contact is established between the valve 25 and its seat 11.

The wave generator illustrated in FIG. 1 operates as follows.

The combustion gases can be discharged from the device either in a controlled way or automatically. In normal seismic exploration practice, the operation is controlled from the recording laboratory. Automatic operation involves subordination of the recording laboratory to the wave generator.

In either case, the combustive or oxidant gas is fed permanently through the passage 6 into the combustion chamber 5, while compressed air is simultaneously admitted through the passage 19 into the chamber 36. This compressed air pushes the piston 32 downwards and presses on the piston 26, which in turn presses the valve 25 on its seat 11, thereby shutting the combustion chamber 5.

The coil of the three-way electrovalve 13 is excited, so that it simultaneously feeds compressed air into the piloted valves 15 and 21, and through the passage 12 into the chamber 35. Piloted valve 15 shuts off the passage 14, and piloted valve 21 places the chamber 36 in communication with the external medium. The air fed into the chamber 35 performs two simultaneous functions: it keeps the valve 25 against its seat, and also pushes the piston 32 back upwards.

This piston 32, because of its differential section, discharges the fuel contained in 17 under high pressure into passages 7, and through injectors 24 into chamber 5. The fuel ignites when contacting the ignition means 9. High-speed combustion transforms the fuel-oxidant mixture into high pressure and high temperature combustion gases.

1st example of operation: controlled discharge

In this case, the air fed into the chamber 35 by means of electrovalve 13 is at sufficient pressure to keep the valve 25 shut when combustion is completed.

To discharge the combustion gases, exciting of the electrovalve 13 is discontinued. The piloted valve 15 releases the air from chamber 35, and places this chamber in communication with the external medium. Valve 25 is no longer held against its seat, and the upward thrust of the gases on the surface 30 raises the valve 25 so that it releases the combustion gases very fast. At the same time, the piloted valve 21 shuts the passage 20 and the compressed air arriving through passage 19 gradually restores the device to the position for starting a new cycle of operation, the duration of this last phase being such that all the combustion gases are discharged.

2nd example of operation: Automatic discharge

In this case, the air introduced into chamber 35 by electrovalve 13 is at a pressure such that, for an intermediate value of the pressure of combustion gases, which intermediate value is lower than the normal pressure on completion of combustion and higher than the initial pressure of the oxidant, valve 25 is no longer kept against its seat 11. The upward thrust acting on surface 30 raises valve 25, and the gases move into the space between valve 25 and its seat 11, thereby increasing the area over which the upward thrust is exerted, and accordingly increasing the speed at which the valve 25 moves upwardly.

The combustion gases are released very fast.

When electrovalve 13 is no longer excited, the air contained in chamber 35 is discharged, and the final phase of the operation is the same as in the case of operation with controlled discharge.

To summarize, the difference between the above two modes of functioning is as follows:

in the first case, the pressure of air admitted into 35 keeps the valve 25 shut, and firing is initiated by de-exciting the electrovalve 13;

in the second case, the pressure of air admitted into the chamber 35 no longer keeps the valve 25 shut once a certain pressure of combustion gases is reached in chamber 5, and opening takes place independently of the termination of the excitation of electrovalve 13.

Operation of wave generators such as those illustrated in FIGS. 2 and 3 is the same way as that of the device illustrated in FIG. 1. However, it should be pointed out in the embodiments shown only controlled firing is possible.

The main characteristics of the three embodiments are shown in the table below.

| Embodiment | 1 | 2 | 3 |
|---|---|---|---|
| Weight | 450 kg | 80 kg | 80 kg |
| Height | 1 cm | 50 cm | 80 cm |
| Diameter | 50 cm | 35 cm | 30 cm |
| Combustion chamber capacity | 2000 cm³ | 390 cm³ | 160 cm³ |

Consumption of fuel for one injection into a chamber at 140 bars is 2 cc gas-oil per 16 cc of chamber.

In controlled operation, discharges of gas take place every 6 to 10 seconds. In automatic operation, a cycle providing one wave every 5 seconds must be envisaged.

If air at a pressure of 140 bars is used as oxidant, an emission pressure of 800 bars is usually be reached. If oxygen-enriched air is used, the pressure can be as much as 1,200 or even 1,400 bars.

In the embodiment illustrated in FIG. 1, the combustion gases are discharged axially downwards into the liquid medium.

This form of discharge helps to focus the energy released onto a zone beneath the emitting device, and increases the emission spectrum of acoustic waves towards the high frequencies.

In the embodiment illustrated in FIG. 2, the combustion gases are discharged into the liquid medium in radial layers sloping slightly downwardly. The area of contact between the gaseous and liquid phases is extensive, so that the device shown in FIG. 2 enhances the low frequencies of the mechanical wave emission spectrum.

In the embodiment illustrated in FIG. 3, the combustion gases are discharged radially into the liquid medium, in separate jets. As radial discharge prevents any reaction effect, the wave emitting device is not raised when the valve opens.

This feature which is most useful where shallow water is involved, lagoons, swamps, ponds, is also useful in an environment of slurry, for example in a slurry basin on drilling sites. The raised sections protect the valve against solid objects.

What is claimed is:

1. In a device for emitting mechanical waves comprising a pneumatic chamber for holding a high-pressure fluid, a valve member, and an element having a seat cooperating with said valve member, said element and valve member being coaxial and defining a combustion chamber adjacent said pneumatic chamber and adapted to be opened and closed by axial movement of said valve member, said combustion chamber being equipped with means for admitting fuel and oxidant and with ignition means, the improvement according to which said valve member is a differential piston having a first side which defines a mobile wall of the pneumatic chamber and an opposite side which defines a mobile wall of said combustion chamber.

2. A device as claimed in claim 1, wherein the valve seat comprises an annular projection adapted to cooperate with said valve member to define a hermetic seal.

3. A device as claimed in claim 1, wherein the valve member comprises an annular projection adapted to cooperate with said valve seat to define a hermetic seal.

4. A device as claimed in claim 2, wherein the surfaces of said valve seat and valve member facing each other and extending outwardly from said annular projection have an equal angle of inclination of at least several degrees to a common axis, the distance between said surfaces being equal to the height of said projection.

5. A device as claimed in claim 4, wherein the geometrical projection along the axis of the surfaces of said valve seat and valve facing each other and extending outwardly from said annular projection is equal to at least 25% of the geometrical projection along the axis of the surface of said mobile wall of said combustion chamber.

6. A device as claimed in claim 1, wherein the combustion chamber is annular in shape.

7. A device as claimed in claim 1, wherein said valve is arranged inside said element.

8. A device as claimed in claim 1, wherein said valve is arranged outside said element.

9. A device as defined in claim 1, wherein said combustion chamber occupies an axial portion of said casing, said valve being slidably mounted in said element while vents are provided in the latter opposite and in register with said valve seat.

10. A device as claimed in claim 3, wherein the surfaces of said valve member facing each other and extending outwardly from said annular projection have an equal angle of inclination of at least several degrees to a common axis, the distance between said surfaces being equal to the height of said projection.

* * * * *